US012187303B2

(12) United States Patent
Fukui

(10) Patent No.: US 12,187,303 B2
(45) Date of Patent: Jan. 7, 2025

(54) ERRONEOUS START SUPPRESSION DEVICE FOR A VEHICLE

(71) Applicant: TOYOTA JIDOSHA KABUSHIKI KAISHA, Toyota (JP)

(72) Inventor: Yusuke Fukui, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 304 days.

(21) Appl. No.: 17/972,076

(22) Filed: Oct. 24, 2022

(65) Prior Publication Data

US 2023/0129531 A1 Apr. 27, 2023

(30) Foreign Application Priority Data

Oct. 26, 2021 (JP) ................................. 2021-174644

(51) Int. Cl.
*B60W 50/08* (2020.01)
*B60W 40/08* (2012.01)
*B60W 40/13* (2012.01)

(52) U.S. Cl.
CPC .......... *B60W 50/085* (2013.01); *B60W 40/08* (2013.01); *B60W 40/13* (2013.01); *B60W 2300/14* (2013.01); *B60W 2540/10* (2013.01); *B60W 2554/20* (2020.02)

(58) Field of Classification Search
CPC .... B60W 50/085; B60W 40/08; B60W 40/13; B60W 2300/14; B60W 2540/10; B60W 2554/20; B60W 2530/203; B60W 2530/207; B60W 50/10
See application file for complete search history.

(56) References Cited

U.S. PATENT DOCUMENTS

| RE46,828 E | * | 5/2018 | Spillane ................. B60K 35/10 |
| 11,001,255 B2 | | 5/2021 | Fukuman et al. |
| 2010/0010715 A1 | * | 1/2010 | Inoue ........................ B60T 7/22 701/51 |
| 2014/0025267 A1 | * | 1/2014 | Tezuka ............ B60W 30/18027 701/51 |
| 2019/0009775 A1 | | 1/2019 | Ito et al. |
| 2019/0072180 A1 | * | 3/2019 | Kim ...................... F16H 63/483 |
| 2019/0375382 A1 | * | 12/2019 | Nakatsuka ............... B60T 7/14 |
| 2021/0001854 A1 | * | 1/2021 | Niewiadomski ...... B60W 10/04 |

(Continued)

FOREIGN PATENT DOCUMENTS

| JP | 2013-129228 A | 7/2013 |
| JP | 2017-114430 A | 6/2017 |

*Primary Examiner* — Sze-Hon Kong
(74) *Attorney, Agent, or Firm* — Dinsmore & Shohl LLP

(57) ABSTRACT

An erroneous start suppression device equipped with an electronic control unit that controls a drive device that generates a driving force of a vehicle, and the electronic control unit determines whether or not an accelerator operation of a driver is an erroneous operation based on whether or not a predetermined determination condition is satisfied; limits a driving force generated by the drive device when the electronic control unit determines that the accelerator operation of the driver is an erroneous operation; determines whether or not the vehicle is towing a towed vehicle; and changes the predetermined determination condition so that it becomes difficult to determine that the predetermined determination condition is satisfied when it is determined that the vehicle is towing a towed vehicle.

6 Claims, 5 Drawing Sheets

(56) References Cited

U.S. PATENT DOCUMENTS

| | | | | |
|---|---|---|---|---|
| 2021/0053589 A1* | 2/2021 | Mizoguchi | ........ | B60W 60/0025 |
| 2021/0078557 A1* | 3/2021 | Kobune | ................ | B60T 13/741 |
| 2021/0078577 A1* | 3/2021 | Roques | ................ | B60L 3/0061 |
| 2021/0094441 A1* | 4/2021 | Sampson | .................. | B60K 1/02 |
| 2021/0237720 A1* | 8/2021 | Chen | .................. | B60W 40/105 |
| 2021/0323542 A1* | 10/2021 | Naka | ...................... | B60K 28/00 |
| 2022/0396266 A1* | 12/2022 | Kim | ...................... | B60W 40/09 |
| 2023/0052064 A1* | 2/2023 | Kawahara | ............. | B60W 10/04 |

* cited by examiner

ERRONEOUS START SUPPRESSION DEVICE FOR A VEHICLE

CROSS-REFERENCE TO RELATED APPLICATION

This application claims priority to Japanese Patent Application No. JP2021-174644 filed on Oct. 26, 2021, the content of which is hereby incorporated by reference in its entirety into this application.

BACKGROUND

1. Technical Field

The present disclosure relates to an erroneous start suppression device for a vehicle such as an automobile.

2. Description of the Related Art

As described in Japanese Patent Application Laid-open No. 2013-129228, for example, as one of driving support devices, there is known an erroneous start suppression device configured to limit a driving force of a vehicle when it is determined that an accelerator operation of a driver is an erroneous operation by determining that a predetermined determination condition is satisfied. According to this type of driving support device, it is possible to suppress an erroneous start of a vehicle due to an erroneous accelerator operation of a driver.

A vehicle such as an automobile may tow a towed vehicle (trailer) as a tractor. When a vehicle is towing a towed vehicle, a total weight of the vehicles, that is, a sum of a weight of the vehicle and a weight of the towed vehicle is larger than that when the vehicle is not towing the towed vehicle. Therefore, a driving force required to drive the vehicle is also larger, and an amount of accelerator operation by a driver is also larger. In particular, when the vehicle starts, both a magnitude and an increasing speed of the accelerator operation amount of the driver become larger.

However, in the conventional erroneous start suppression device such as the driving support device described in the above Japanese Patent Application Laid-open Publication, it is not taken into consideration that a driving force required to drive a vehicle differs and an accelerator operation amount of a driver also differs depending on whether or not the vehicle is towing a towed vehicle. Therefore, when a vehicle is towing a towed vehicle, a driving force of the vehicle may be unnecessarily limited due to an erroneous determination that an accelerator operation of a driver is an erroneous operation in spite that the accelerator operation is not an erroneous operation.

SUMMARY

The present disclosure provides an erroneous start suppression device that is improved so as to reduce a possibility that a driving force of a vehicle is unnecessarily limited due to an erroneous determination that an erroneous accelerator operation is conducted in a situation where the vehicle is towing a towed vehicle.

According to the present disclosure, an erroneous start suppression device for a vehicle is provided that is equipped with an electronic control unit that controls a drive device that generates a driving force of the vehicle, and the electronic control unit determines whether or not an accelerator operation of a driver is an erroneous operation based on whether or not a predetermined determination condition is satisfied and limits a driving force generated by the drive device when the electronic control unit determines that the accelerator operation of the driver is an erroneous operation.

The electronic control unit determines whether or not the vehicle is towing a towed vehicle and changes the predetermined determination condition so that it becomes difficult to determine that the predetermined determination condition is satisfied when it is determined that the vehicle is towing a towed vehicle.

According to the above configuration, it is determined whether or not the vehicle is towing a towed vehicle and when it is determined that the vehicle is towing a towed vehicle, the predetermined determination condition is changed so that it becomes difficult to determine that the predetermined determination condition is satisfied.

Therefore, in a situation where the vehicle is towing a towed vehicle, it becomes difficult to determine that the predetermined determination condition is satisfied, so that it is possible to reduce a possibility that the driving force of the vehicle is unnecessarily limited due to an erroneous determination that an erroneous accelerator operation is conducted.

In one aspect of the present disclosure, the predetermined determination condition includes that an accelerator opening is equal to or larger than a first reference opening and an accelerator opening speed is equal to or higher than a reference opening speed, and the electronic control unit is further configured to change at least one of the first reference opening and the reference opening speed to be larger when it is determined that the vehicle is towing a towed vehicle.

According to the above aspect, it is determined whether or not an accelerator operation of the driver is an erroneous operation by determining whether or not the predetermined condition including that an accelerator opening is equal to or larger than the first reference opening and an accelerator opening speed is equal to or higher than the reference opening speed is satisfied. Further, when it is determined that the vehicle is towing a towed vehicle, at least one of the first reference opening and the reference opening speed is changed to be larger.

Therefore, the predetermined determination condition can be changed so that it becomes difficult to determine that the predetermined determination condition is satisfied compared to where neither the first reference opening nor the reference opening speed is changed to be larger even when the vehicle is towing a towed vehicle.

In another aspect of the present disclosure, the predetermined determination condition includes that a vehicle speed of the vehicle is equal to or lower than a reference value and an accelerator opening is equal to or larger than a second reference opening, and the electronic control unit is further configured to change the second reference opening to be larger when it is determined that the vehicle is towing a towed vehicle.

An erroneous start due to an erroneous accelerator operation of the driver occurs when an accelerator operation amount of the driver becomes excessive in a situation where the vehicle is stationary or travels at an extremely low speed. Therefore, it is necessary to determine both a vehicle speed and an accelerator operation amount.

According to the above aspect, it is determined whether or not an accelerator operation of the driver is an erroneous operation by determining whether or not the predetermined condition including that a vehicle speed of the vehicle is equal to or higher than the reference value and an accelerator opening is equal to or larger than the second reference opening is satisfied. Further, when it is determined that the vehicle is towing a towed vehicle, the second reference opening is changed to be larger.

Therefore, the predetermined determination condition can be changed so that it becomes difficult to determine that the predetermined determination condition is satisfied compared to where the second reference opening is not changed to be larger even when the vehicle is towing a towed vehicle. Further, since a vehicle speed is determined, it is possible to determine whether or not an erroneous start may occur due to an erroneous accelerator operation of the driver more accurately compared to where a vehicle speed is not determined.

In another aspect of the present disclosure, the electronic control unit is configured to limit the driving force generated by the drive device to an upper limit value when it is determined that the accelerator operation of the driver is an erroneous operation, and the electronic control unit is further configured to increase the upper limit value as compared to where it is determined that the vehicle is not towing a towed vehicle when it is determined that the vehicle is towing a towed vehicle.

According to the above aspect, when it is determined that the accelerator operation of the driver is an erroneous operation, the driving force generated by the drive device is limited to the upper limit value. Further, when it is determined that the vehicle is towing a towed vehicle, the upper limit value is increased as compared to where it is determined that the vehicle is not towing a towed vehicle.

Therefore, it is possible to reduce a possibility that the vehicle does not start smoothly due to an insufficient driving force generated by the drive device compared to where the upper limit is not increased even when it is determined that the vehicle is towing a towed vehicle.

Further, in another aspect of the present disclosure, the electronic control unit is configured to acquire information on a total weight of the vehicle and a towed vehicle, and variably set the upper limit value according to the total weight so that the larger the total weight is, the larger the upper limit value is.

In a situation where the vehicle climbs a slope towing a towed vehicle, assuming that an inclination angle of the slope is 9, a force obtained by multiplying a total weight, which is the sum of the weights of the vehicle and the towed vehicle, by sin 8 acts on the vehicle and the towed vehicle in a downward direction along the slope. This downward force increases as the total weight increases. Therefore, if a driving force of the vehicle is insufficient, not only the start of the vehicle and the towed vehicle is hindered, but also the vehicle and the towed vehicle slide down along the slope.

According to the above aspect, the upper limit value is variably set according to the total weight of the vehicle and a towed vehicle so that the larger the total weight is, the larger the upper limit value is. Therefore, compared to where the upper limit value is not variably set according to the total weight as described above, in the situation where the vehicle is towing a towed vehicle and climbs a slope, it is possible to reduce a possibility that the vehicle and the towed vehicle are hindered from starting or the vehicle and the towed vehicle slide down along the slope due to an insufficient driving force of the vehicle.

Further, in another aspect of the present disclosure, the electronic control unit is configured to limit the driving force generated by the drive device to the upper limit value when it is determined that there is an obstacle in front of the vehicle and the accelerator operation of the driver is an erroneous operation.

In a situation where there is an obstacle in front of the vehicle and the vehicle may collide with the obstacle, it is necessary to limit the driving force of the vehicle in the event of an erroneous start due to an erroneous accelerator operation of the driver arises. Therefore, it is necessary to determine whether or not there is an obstacle in front of the vehicle.

According to the above aspect, the driving force generated by the drive device is limited to the upper limit value when it is determined that there is an obstacle in front of the vehicle and the accelerator operation of the driver is an erroneous operation. Therefore, while avoiding unnecessarily limiting the driving force in a situation where there is no obstacle in front of the vehicle, the driving force can be limited and the erroneous start can be suppressed in a situation where the vehicle may collide with an obstacle if the vehicle starts erroneously.

Other objects, other features and attendant advantages of the present disclosure will be readily understood from the description of the embodiments of the present disclosure described with reference to the following drawings.

DETAILED DESCRIPTION

The present disclosure will now be described in detail with reference to the accompanying drawings.

First Embodiment

Figure 1:
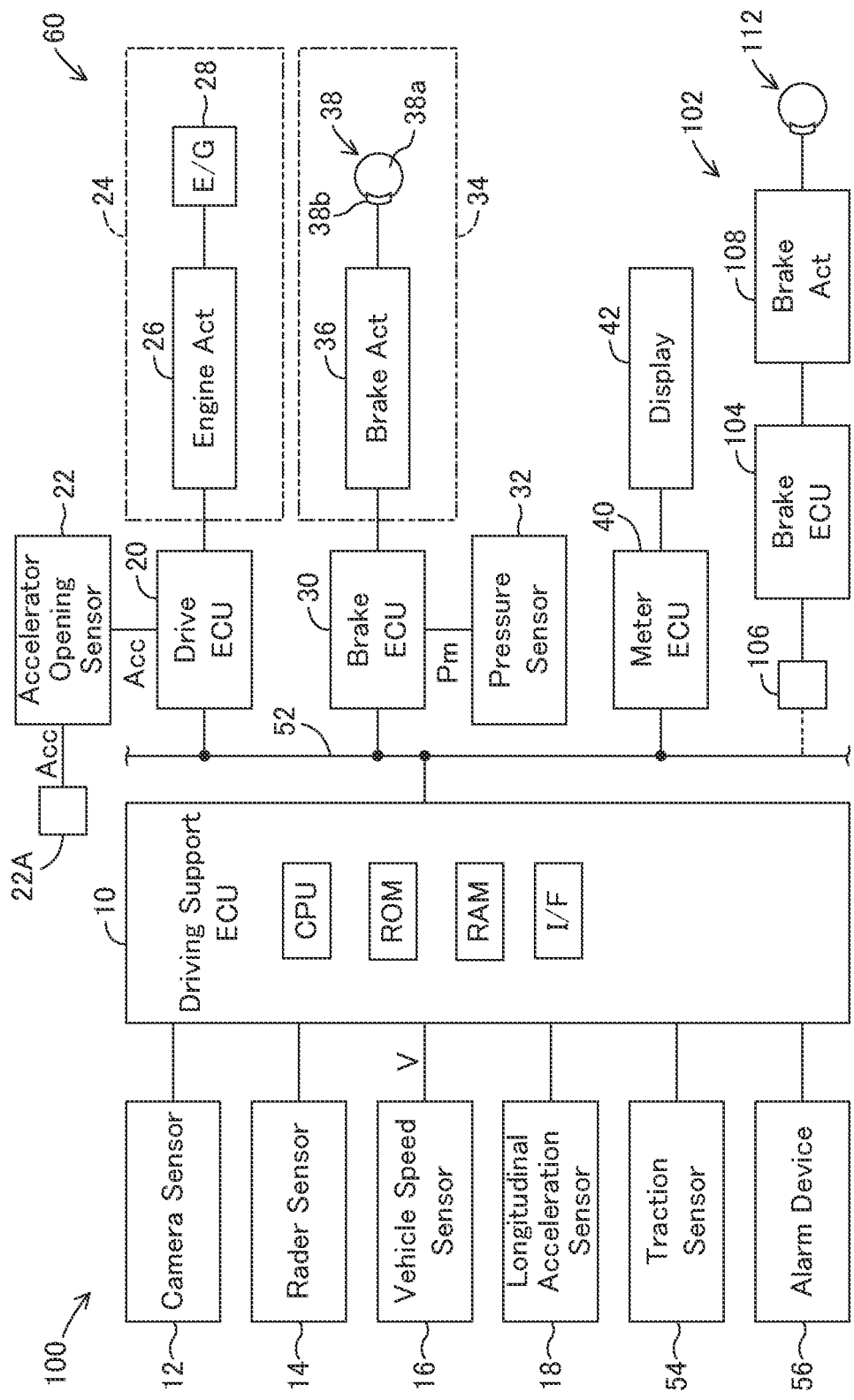
FIG. 1 is a schematic configuration diagram showing an embodiment of an erroneous start suppression device according to the present disclosure.

As shown in FIG. 1, the erroneous start suppression device 100 according to the embodiment is applied to a vehicle 60 that may be an autonomous vehicle and includes a driving support ECU 10. The vehicle 60 includes a drive ECU 20, a brake ECU 30, and a meter ECU 40. In the following description, in order to distinguish the vehicle 60 from other vehicles such as a preceding vehicle, it is referred to as the own vehicle as necessary.

Each ECU is an electronic control unit including a microcomputer as a main part, and is connected to each other so as to be able to transmit and receive information via a CAN (Controller Area Network) 52. The microcomputer of each ECU includes a CPU, ROM, RAM, non-volatile memory, interfaces, and the like. The CPU realizes various functions by executing instructions (programs, routines) stored in the ROM. Some or all of these ECUs may be integrated into one ECU.

Figure 3:
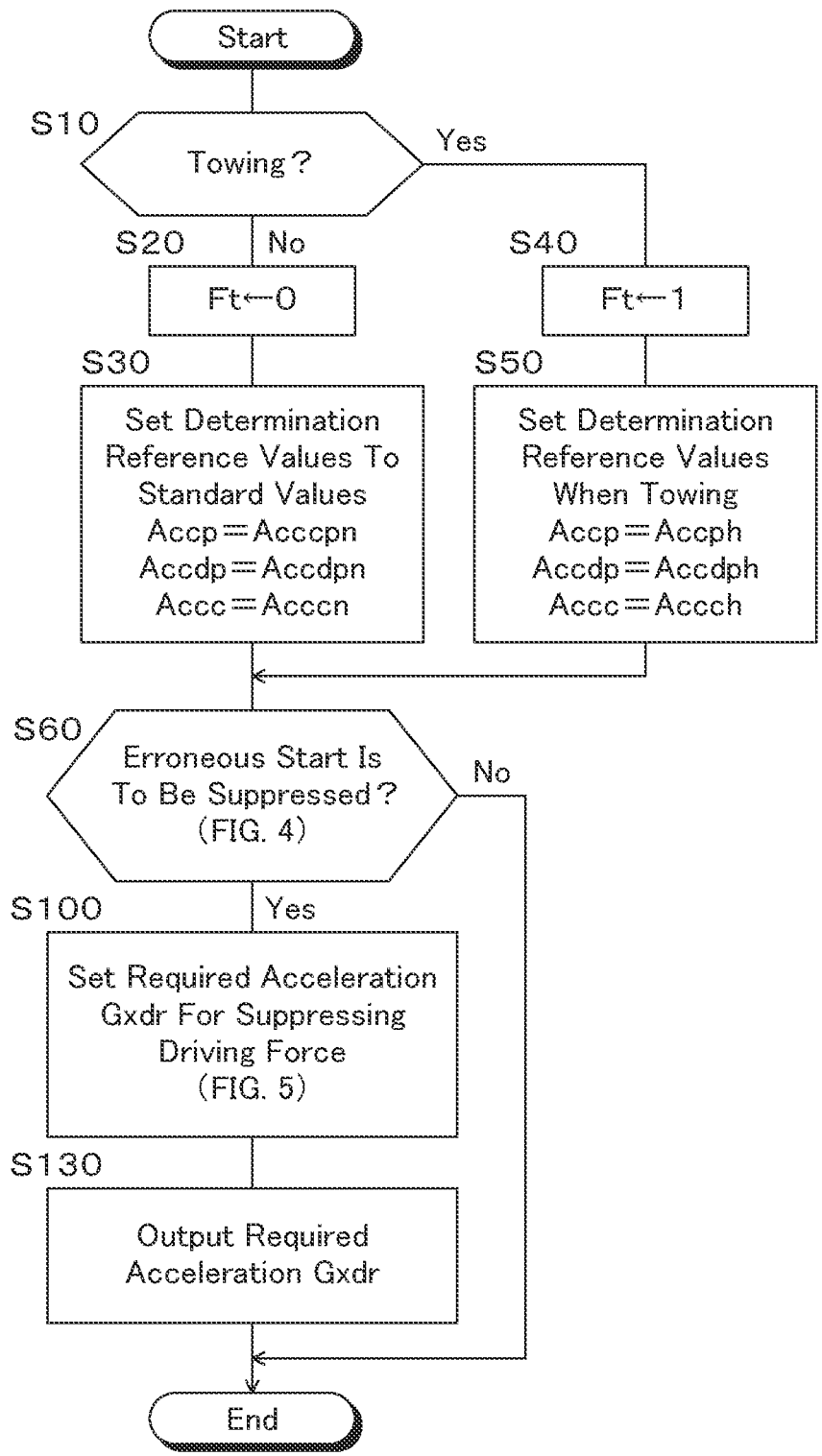
FIG. 3 is a flowchart showing a command control routine for suppressing driving force in the embodiment.

As will be described in detail later, the ROM of the driving support ECU 10 stores erroneous start suppression control programs corresponding to the flowcharts shown in FIGS. 3 to 5, and the CPU performs erroneous start suppression control according to the programs. As will be described in detail later, the CPU determines whether or not an accelerator operation of a driver is an erroneous operation and an erroneous start should be suppressed, based on whether or not a predetermined determination condition is satisfied. When the CPU determines that the accelerator operation of the driver is an erroneous operation, the CPU limits a driving force of the vehicle 60 by outputting a signal indicating a required acceleration Gxdr to the drive ECU 20.

The CPU determines whether or not the vehicle 60 is towing a towed vehicle, and when it is determined that the vehicle is towing a towed vehicle, it changes a predetermined determination condition so that it becomes difficult to determine that the predetermined determination condition is satisfied. Further, when the CPU determines that the vehicle 60 is towing the towed vehicle, the CPU sets the required acceleration Gxdr to a larger value than when it is determined that the vehicle is not towing a towed vehicle.

Further, the ROM of the driving support ECU 10 stores a collision avoidance support control program (not shown in the drawing), and the CPU executes collision avoidance support control according to the program. That is, when an obstacle is detected in front of the own vehicle 60, the CPU of the driving support ECU 10 issues an alarm to the driver by an alarm device 56, and when a possibility of collision becomes higher, When the possibility of collision becomes higher, the CPU prevents the own vehicle from colliding with the obstacle by automatic braking control. Since the collision avoidance support control is generally called PCS control (pre-crash safety control), the collision avoidance support control is hereinafter called PCS control.

As shown in FIG. 1, a camera sensor 12, a radar sensor 14, a vehicle speed sensor 16, a longitudinal acceleration sensor 18, a traction sensor 54, and the alarm device 56 are connected to the driving support ECU 10. At least one of the camera sensor 12, the radar sensor 14, the vehicle speed sensor 16, the longitudinal acceleration sensor 18, the traction sensor 54, and the alarm device 56 may be connected to the CAN 52.

Although not shown in the figure, the camera sensor 12 includes a camera unit and a recognition unit that analyzes image data obtained by taking a picture by the camera unit, and recognizes a target such as a white line on a road, a preceding vehicle, or another vehicle that is stopped. The camera unit of the camera sensor 12 captures scenery in front of the vehicle 60. The recognition unit of the camera sensor 12 supplies information about the recognized target to the driving support ECU 10 every time a predetermined time elapses.

The radar sensor 14 includes a radar transmitter/receiver unit and a signal processing unit (not shown). The radar transmitter/receiver unit emits radio waves in a millimeter wave band (hereinafter referred to as "millimeter wave") and receives millimeter waves (that is, reflected waves) reflected by a three-dimensional object (for example, another vehicle, a bicycle, a guardrail, etc.) existing in a radiation range. The signal processing unit acquires a distance between the own vehicle and a three-dimensional object, a relative speed of the own vehicle with respect to the three-dimensional object, a relative position (direction) of the three-dimensional object with respect to the own vehicle, and the like based on a phase difference between the transmitted millimeter wave and the received reflected wave, an attenuation level of the reflected wave, a time from the transmission of the millimeter wave to the reception of the reflected wave, and the like, and supplies acquired information (referred as circumferential information) to the driving support ECU 10 at a predetermined cycle.

The ECU 20 synthesizes the target information supplied from the camera sensor 12 and the three-dimensional object information supplied from the radar sensor 14 to acquire highly accurate three-dimensional object information. Therefore, the camera sensor 12 and the radar sensor 14 function as an obstacle detection device that detects an obstacle in front of the vehicle 12. In addition, LiDAR (Light Detection And Ranging) may be used instead of the radar sensor 14.

Figure 2:
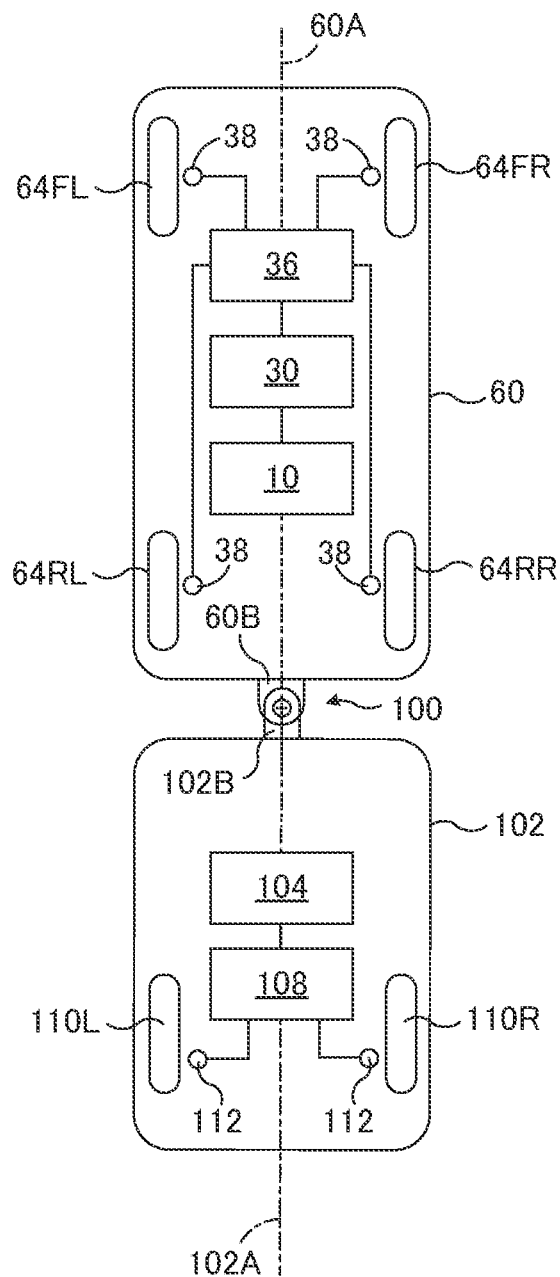
FIG. 2 is a diagram showing a situation in which a vehicle is towing a trailer that is a towed vehicle.

The vehicle speed sensor 16 detects a vehicle speed V by detecting a wheel speed of each wheel of the vehicle 60, and supplies a signal indicating the vehicle speed V to the driving support ECU 10. The longitudinal acceleration sensor 18 detects a longitudinal acceleration Gx of the vehicle 60 and supplies a signal indicating the longitudinal acceleration Gx to the driving support ECU 10. The traction sensor 54 detects whether or not the vehicle 60 is towing a towed vehicle (trailer) 102 as shown in FIG. 2, and supplies a signal indicating the detection result to the driving support ECU 10.

An accelerator opening sensor 22 and a drive device 24 that generates a driving force of the vehicle 60 are connected to the drive ECU 20. The accelerator opening sensor 22 detects an amount of depression of an accelerator pedal 22A by the driver, that is, an accelerator opening Acc that indicates a driving operation amount of the driver, and supplies a signal indicating the accelerator opening Acc to the drive ECU 20 and the driving support ECU 10. The drive device 24 includes an engine actuator 26 and an engine 28.

The engine actuator 26 is an actuator for changing an operating state of the engine 28, and includes, for example, a throttle valve actuator for changing an opening degree of a throttle valve. The drive ECU 20 calculates a target acceleration Gdt of the vehicle based on the accelerator opening Acc detected by the accelerator opening sensor 22, and control an operation of the engine actuator 26 so that a driving force of the vehicle 60 becomes a driving force corresponding to the target acceleration Gdt.

When the drive ECU 20 receives a signal indicating a required acceleration Gxdr as a driving force suppression command from the driving support ECU 10, the drive ECU controls the operation of the engine actuator 26 so that the driving force of the vehicle 60 becomes a driving force corresponding to the required acceleration Gxdr. That is, the drive ECU 20 controls the operation of the engine actuator 26 so as to suppress an output torque (driving force of the vehicle 60) generated by the engine 28.

When the vehicle 60 is an electric vehicle, the engine actuator 26 is a drive device for an electric motor or electric motors, and when the vehicle is a hybrid vehicle, the engine actuator 26 is a drive device for an engine actuator and an electric motor or electric motors. The vehicle 60 may be either of a front-wheel drive vehicle in which drive wheels are left and right front wheels, a rear-wheel drive vehicle in which drive wheels are left and right rear wheels, and a four-wheel drive vehicle in which drive wheels are left and right front wheels and left and right rear wheels.

A pressure sensor 32 and a brake device 34 that generates braking force of the vehicle 60 are connected to the brake ECU 30. The pressure sensor 32 detects a master cylinder pressure Pm indicating a braking operation amount of the driver, and supplies a signal indicating the master cylinder pressure Pm to the brake ECU 30 and the driving support ECU 10. The brake device 34 includes a brake actuator 36 and friction braking mechanisms 38.

The brake actuator 36 is provided in a hydraulic circuit between a master cylinder (not shown) that pressurizes hydraulic oil by a pedaling force of a brake pedal and friction brake mechanisms 38 provided on left and right front wheels 64FL and 64FR and left and right rear wheels 64RL and 64RR (see FIG. 2). Each friction brake mechanism 38 includes a brake disc 38a that rotates with a corresponding wheel and a brake caliper 38b supported by a vehicle body (not shown). The brake actuator 32 adjusts a hydraulic pressure supplied to a wheel cylinder built in each brake caliper 38b in response to an instruction from the brake ECU 30, and the hydraulic pressure presses a brake pad (not shown) against the brake disc 38a to generate friction braking force.

The brake ECU 30 calculates a target deceleration of the vehicle 60 based on the master cylinder pressure Pm detected by the pressure sensor 32, and controls the operation of the brake actuator 36 so that the deceleration of the vehicle becomes the target deceleration. Further, when the brake ECU 30 receives a braking command such as the PCS control from the driving support ECU 10, the brake ECU 30 controls the operation of the brake actuator 36 so that the vehicle 60 decelerates at a required deceleration included in the braking command.

A display 42 is connected to the meter ECU 40. The meter ECU 40 indicates on the display 42 that the driving force is suppressed when the driving force suppression command from the driving support ECU 10 is output (when a erroneous start suppression flag Fc described later is 1 and the driving force is suppressed). The display 42 is, for example, a head-up display or a multi-information display for displaying meters and various information.

The alarm device 56 may be any of an alarm device that emits a visual alarm such as an indicator, an alarm lamp, an alarm device that emits an auditory alarm such as an alarm buzzer, and an alarm device that emits a sensory alarm such as seat vibration, and any combination thereof.

In the embodiment, the CPU of the driving support ECU 10 calculates a total weight W of the vehicle 60 based on a relationship between a longitudinal acceleration Gx of the vehicle 60 detected by the longitudinal acceleration sensor 18 and a braking force Fvb of the vehicle supplied from the brake ECU 30 when the vehicle 60 is braked and stores the total weight in the RAM. The total weight W is a sum of a weight of the vehicle 60 and a weight of a towed vehicle when the vehicle 60 is towing the towed vehicle. Further, the total weight W may be estimated based on a relationship between a longitudinal acceleration Gx of the vehicle 60 detected by the longitudinal acceleration sensor 18 and a driving force Fvd of the vehicle supplied from the drive ECU 20 when the vehicle 60 is driven. Further, the total weight W may be estimated by an ECU other than the driving support ECU 10.

As shown in FIG. 2, a front end bracket 102B of the towed vehicle 102 can be connected to a rear end bracket 60B of the vehicle 60 by a joint 100. Therefore, the vehicle 60 functions as a tractor for towing the towed vehicle 102 as needed.

As shown in FIG. 2, when the vehicle 60 and the towed vehicle 102 are in a straight-ahead state, a longitudinal center line 60A of the vehicle 60 and a longitudinal center line 102A of the towed vehicle 102 align with each other, and the center of the joint 100 is located on these longitudinal centerlines. Further, although not shown in the drawing, when the vehicle 60 and the towed vehicle 102 are in a turning state, the longitudinal center line 60A of the vehicle 60 and the longitudinal center line 102A of the towed vehicle 102 intersect each other and the center of the joint 100 is located on an intersection of these longitudinal centerlines.

The towed vehicle 102 is equipped with a brake ECU 104, and the brake ECU 104 can electrically be connected to the driving support ECU 10 via a connector 106 and the CAN 52 as shown in FIG. 1. The traction sensor 54 may be a switch that turns on when the driving support ECU 10 and the brake ECU 104 are electrically connected by the connector 106.

A brake actuator 108 is connected to the brake ECU 104. The brake actuator 108 is provided in a hydraulic circuit between a hydraulic source (not shown) for supplying high-pressure hydraulic oil and friction brake mechanisms 112 provided on a left wheel 110L and a right wheel 110R. The friction brake mechanisms 112 are configured in the same manner as the friction brake mechanisms 38, and are controlled by the brake ECU 104 so that a friction braking force corresponding to the driver's required deceleration or the PCS control required deceleration is generated at each wheel.

<Command Control Routine for Suppressing Driving Force>

Next, the command control routine for suppressing a driving force in the embodiment will be described with reference to the flowchart shown in FIG. 3. The command control for suppressing the driving force according to the flowchart shown in FIG. 3 is repeatedly executed by the CPU of the driving support ECU 10 in a predetermined control cycle when a driving support switch (not shown in FIG. 1) is on.

In the following description, the command control for suppressing the driving force is simply referred to as "command control". Further, in the following description of command control, the CPU is the CPU of the driving support ECU 10. Further, at the start of the command control for suppressing the driving force, all the flags Ft, Fa, Fb and Fc are initialized to 0.

First, in step S10, the CPU determines whether or not the vehicle 60 is towing a towed vehicle by determining whether or not a towed vehicle towed by the vehicle 60 is detected by the traction sensor 54. When an affirmative determination is made, the CPU advances the command control to step S40, and when a negative determination is made, the CPU advances the command control to step S20.

In step S20, the CPU sets the flag Ft to 0. When the flag Ft is 0, it means that the vehicle 60 is not towing a towed vehicle, and when the flag Ft is 1, it means that the vehicle 60 is towing a towed vehicle.

In step S30, the CPU sets reference values Accp and Accc for the determination regarding an accelerator opening Acc to standard values Accpn and Acccn, respectively, and sets a reference value Accdp for the determination regarding an accelerator opening speed Accd to a standard value Accdpn. Accpn and Acccn may be, for example, 70% and 90%, respectively, and Accdpn may be, for example, 100%/sec.

In step S40, the CPU sets the flag Ft to 1. In step S50, the CPU sets the reference values Accp and Accc for the determination regarding the accelerator opening Accd to values Accph and Accch when towing a towed vehicle, respectively, and sets the reference value Accdp for the determination regarding the accelerator opening speed Accd to a value Accdph when towing a towed vehicle. Accph and Accch may be larger than Accpn and Acccn, for example 85% and 95%, respectively, and Accdph may be larger than Accdpn, for example 120%/sec.

Figure 4:
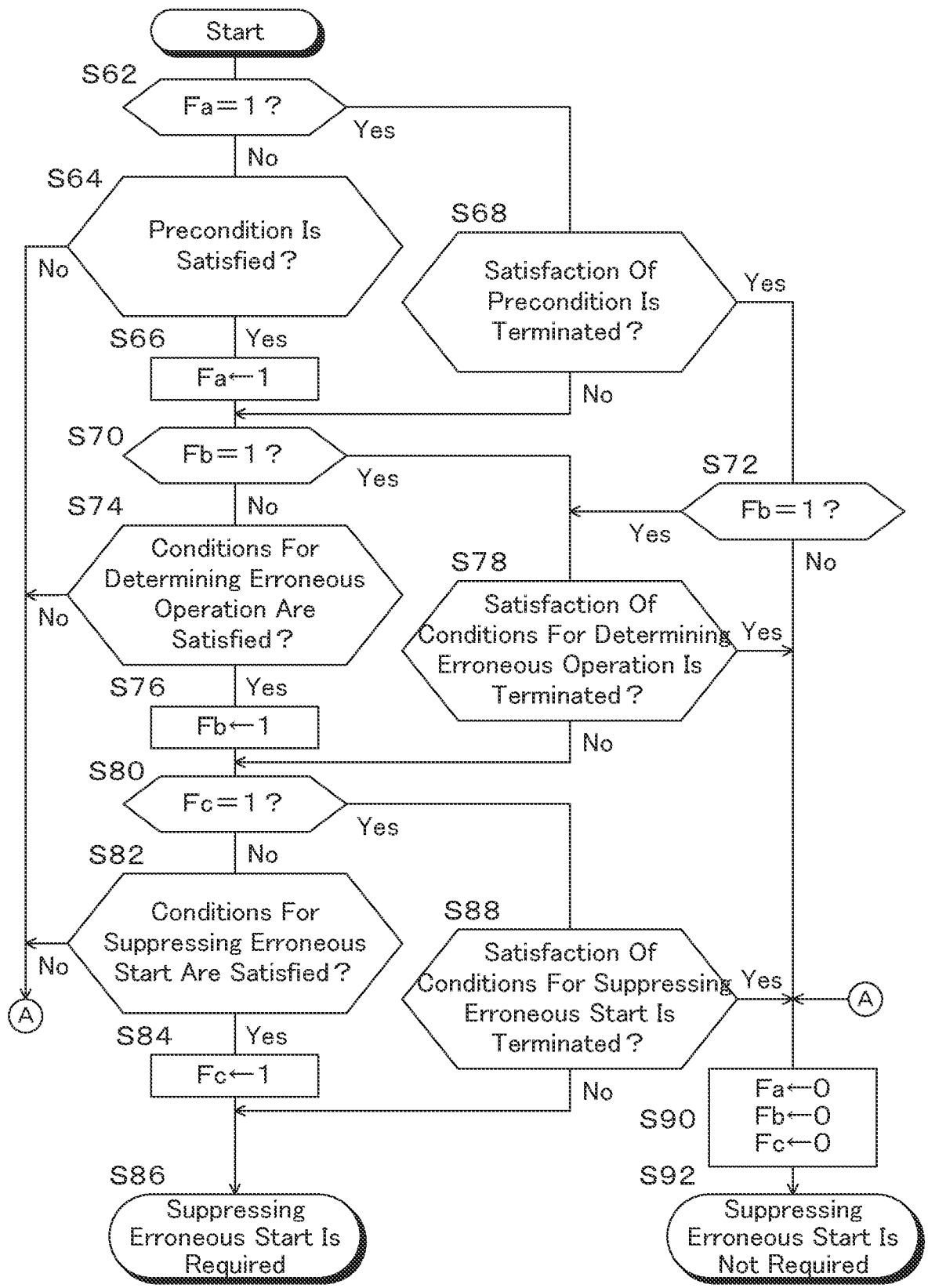
FIG. 4 is a flowchart showing a subroutine for determining necessity of suppressing erroneous start.

In step S60, the CPU determines, according to the flowchart shown in FIG. 4, whether or not accelerator operation of the driver is an erroneous operation and it is necessary to suppress an erroneous start based on whether or not a predetermined determination condition is satisfied. When a negative determination is made, the CPU temporarily terminates the command control, and when an affirmative determination is made, the CPU advances the command control to step S100.

Figure 5:
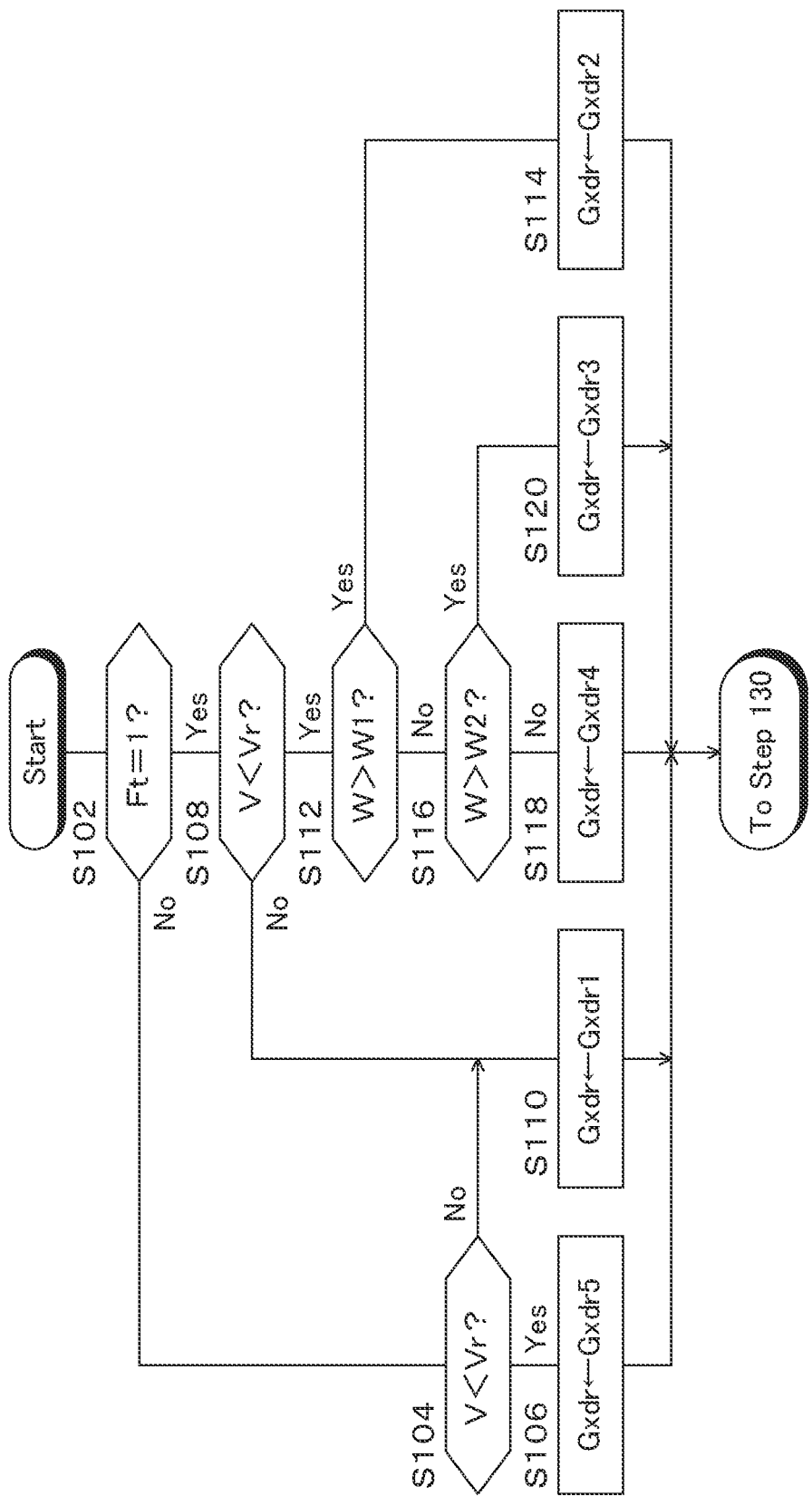
FIG. 5 is a flowchart showing a subroutine for setting and controlling a required acceleration for suppressing a driving force.

In step S100, the CPU sets a required acceleration Gxdr for suppressing the driving force of the vehicle 60 according to the flowchart shown in FIG. 5. As will be described in detail later, the required acceleration Gxdr is set to a larger value when the vehicle 60 is towing a towed vehicle than when the vehicle 60 is not towing a towed vehicle.

In step S130, the CPU outputs a signal indicating the required acceleration Gxdr as a driving force suppression command to the drive ECU 20. Therefore, the driving force of the vehicle 60 is controlled so as to be a driving force corresponding to the required acceleration Gxdr.

<Subroutine for Determining Necessity of Suppressing Erroneous Start>

Next, with reference to the flowchart shown in FIG. 4, the subroutine of a necessity determination control for suppressing erroneous start executed in the above step 60 will be described. In the following description, the necessity determination control for suppressing erroneous start is simply referred to as the necessity determination control.

First, in step S62, the CPU determines whether or not the flag Fa is 1, that is, whether or not an affirmative determination has already been made in step S64 described later. When an affirmative determination is made, the CPU advances the necessity determination control to step S68, and when a negative determination is made, the CPU advances the necessity determination control to step S64.

In step S64, the CPU determines whether or not a precondition for determining that accelerator operation of the driver is an erroneous operation is satisfied by determining whether or not the accelerator opening Acc is equal to or larger than the reference value Accp and the accelerator opening speed Accd is equal to or larger than the reference value Accdp. When a negative determination is made, the CPU advances the necessity determination control to step S90, and when an affirmative determination is made, the CPU sets the flag Fa to 1 in step S66 and then advances the necessity determination control to step S70. The reference value Accp is Accpn when the vehicle 60 is not towing a towed vehicle, and Accph when the vehicle 60 is towing a towed vehicle. The reference value Accdp is Accdpn when the vehicle 60 is not towing a towed vehicle, and Accdph when the vehicle 60 is towing a towed vehicle.

In step S68, the CPU determines whether or not the satisfaction of the precondition has been terminated by determining whether the accelerator opening Acc is equal to or less than an end reference value Accpe (for example, 30%), or whether a reference time tp (for example, 0.5 seconds) or more has elapsed from a time point when an affirmative determination is made in step S64. When an affirmative determination is made, the CPU advances the necessity determination control to step S72, and when a negative determination is made, the CPU advances the necessity determination control to step S70.

In step S70, the CPU determines whether or not the flag Fb is 1, that is, whether or not an affirmative determination has already been made in step S74, which will be described later. When an affirmative determination is made, the CPU advances the necessity determination control to step S78, and when a negative determination is made, the CPU advances the necessity determination control to step S74.

In step S72, the CPU determines whether or not the flag Fb is 1, as in step S70. When an affirmative determination is made, the CPU advances the necessity determination control to step S78, and when a negative determination is made, the CPU advances the necessity determination control to step S90.

In step S74, on the premise that the above precondition is satisfied (Fa=1), the CPU determines whether or not the conditions for determining the erroneous operation are satisfied by determining whether or not all of the following three conditions are satisfied. When a negative determination is made, the CPU advances the necessity determination control to step S90, and when an affirmative determination is made, the CPU sets the flag Fb to 1 in step S76 and then advances the necessity determination control to step S80. The following reference value Accc is Acccn when the vehicle 60 is not towing a towed vehicle, and Accch when the vehicle 60 is towing a towed vehicle.

No braking is executed by the PCS control.

Vehicle speed V is below a reference value Vb (for example, 15 km/h).

Accelerator opening Acc is equal to or larger than the reference value Accc.

In step S78, the CPU determines whether or not the satisfaction of the conditions for determining the erroneous operation has been terminated by determining whether or not the accelerator opening Acc is equal to or smaller than an end reference value Acce (for example, 30%). When an affirmative determination is made, the CPU advances the necessity determination control to step S90, and when a negative determination is made, the CPU advances the necessity determination control to step S80.

In step S80, the CPU determines whether or not the flag Fc is 1, that is, whether or not an affirmative determination has already been made in step S82, which will be described later. When an affirmative determination is made, the CPU advances the necessity determination control to step S88, and when a negative determination is made, the CPU advances the necessity determination control to step S82.

In step S82, on the premise that the above-mentioned conditions for determining the erroneous operation are satisfied (Fb=1), the CPU determines whether or not the conditions for suppressing erroneous start are satisfied by determining whether or not all of the following two conditions are satisfied. When a negative determination is made, the CPU advances the necessity determination control to step S90, and when an affirmative determination is made, the flag Fc is set to 1 in step S84, and it is determined in step S86 that suppression of the erroneous start is required.

There is an obstacle (not shown) within a predetermined distance in front of the vehicle 60.

Vehicle speed V is below a reference value Vc (for example, 10 km/h).

In step S88, the CPU determines whether or not the satisfaction of the conditions for suppressing the erroneous start has been terminated by determining whether or not there is no risk of collision with an obstacle. When a negative determination is made, the CPU advances the necessity determination control to step S86, and when an affirmative determination is made, the CPU advances the necessity determination control to step S90.

In step S90, the CPU resets the flags Fa, Fb and Fc to 0, and in step S92, the CPU determines that suppression of the erroneous start is not required.

<Subroutine for Setting Required Acceleration>

Next, with reference to the flowchart shown in FIG. 5, a subroutine for setting the required acceleration for suppressing the driving force that is executed in step 100 will be described. In the following description, the control for setting the required acceleration is simply referred to as the setting control.

First, in step S102, the CPU determines whether or not the flag Ft is 1, that is, whether or not the vehicle 60 is towing a towed vehicle. When an affirmative determination is made, the CPU advances the setting control to step S108, and when a negative determination is made, the CPU advances the setting control to step S104.

In step S104, the CPU determines whether or not a vehicle speed V is lower than a reference value Vr (for example, 5 km/h). When a negative determination is made, the CPU advances the setting control to step S110, and when an affirmative determination is made, the CPU sets the required acceleration Gxdr to Gxdr5 (for example, 0.3 km/h$^2$) in step S106.

In step S108, the CPU determines whether or not the vehicle speed V is lower than the reference value Vr, as in step S104. When an affirmative determination is made, the CPU advances the setting control to step S112, and when a negative determination is made, the CPU sets the required acceleration Gxdr to Gxdr1 (for example, 2.0 km/h$^2$) in step S110.

In step S112, the CPU determines whether or not a total weight W of the vehicle 60 exceeds a first reference value W1 (for example, 6000 kg). When a negative determination is made, the CPU advances the setting control to step S116, and when an affirmative determination is made, the CPU sets the required acceleration Gxdr to Gxdr2 (for example, 1.5 km/h$^2$) in step S114.

In step S116, the CPU determines whether or not the total weight W of the vehicle 60 exceeds a second reference value W2 (for example, 4000 kg), which is smaller than the first reference value W1. When a negative determination is made, the CPU sets the required acceleration Gxdr to Gxdr4 (for example, 0.5 km/h$^2$) in step S118, and when an affirmative determination is made, the CPU sets the required acceleration Gxdr to Gxdr3 (for example, 0.8 km/h$^2$) in step S120.

The required acceleration Gxdr is a value corresponding to an upper limit value of the driving force. Since the required accelerations Gxdr1 to Gxdr5 decrease in this order, the upper limit of the driving force corresponding to the required accelerations Gxdr1 to Gxdr5 decreases in this order. For example, the upper limit of the driving force corresponding to the required acceleration Gxdr4 is smaller than the upper limit of the driving force corresponding to the required acceleration Gxdr3.

In particular, the required accelerations Gxdr2 to Gxdr4 when the vehicle 60 is towing a towed vehicle are larger than the required accelerations Gxdr5 when the vehicle 60 is not towing a towed vehicle, and are smaller than the required acceleration Gxdr1 when the vehicle speed V is equal to or higher than the reference value Vr. Further, the upper limit values of the driving forces corresponding to the required accelerations Gxdr2 to Gxdr4 are smaller than the acceleration Gxd of the vehicle corresponding to the reference value Accch of the accelerator opening Acc in the determination in step S74. The upper limit of the driving force corresponding to the required acceleration Gxdr5 is smaller than the acceleration Gxd of the vehicle corresponding to the reference value Acccn of the accelerator opening Accc in the determination in step S74.

As can be seen from the above description, according to the embodiment, it is determined whether or not the vehicle 60 is towing a towed vehicle (S10), and when it is determined that the vehicle is towing a towed vehicle, the predetermined determination conditions (the reference values Accp and Accc of the accelerator opening Acc and the reference value Accdp of the accelerator opening speed Accd) are changed so as to make it difficult to determine that the predetermined determination conditions are satisfied (S50).

Therefore, in a situation where the vehicle 60 is towing a towed vehicle, it becomes difficult to determine that the predetermined determination conditions are satisfied. Therefore, it is possible to reduce the possibility that the driving force of the vehicle 60 is unnecessarily limited due to an erroneous determination that an erroneous accelerator operation is conducted.

In particular, according to the embodiment, in the determination of satisfaction of the precondition (S64), it is determined whether or not the accelerator operation of the driver is an erroneous operation by determining whether or not an accelerator opening Acc is equal to or larger than the first reference value Accp and an accelerator opening speed Accd is equal to or larger than the reference value Accdp. Further, when it is determined that the vehicle 60 is towing a towed vehicle (S10), both the first reference value Accp of the accelerator opening and the reference value Accdp of the accelerator opening speed are changed to be larger (S50).

Therefore, the predetermined determination conditions can be changed so that it becomes difficult to determine that the predetermined determination conditions are satisfied as compared to where neither the first reference value Accp nor the reference value Accdp is changed to be larger even when the vehicle 60 is towing a towed vehicle.

Further, according to the embodiment, in the determination of the erroneous accelerator operation, whether or not the accelerator operation of the driver is an erroneous operation is determined by determining whether or not the vehicle speed V of the vehicle 60 is equal to or lower than the reference value Vb and the accelerator opening Acc is equal to or larger than the second reference value Accc. In addition, when it is determined that the vehicle 60 is towing a towed vehicle, the second reference value Accc is changed to be larger.

Therefore, the predetermined determination conditions can be changed so that it becomes difficult to determine that the predetermined determination conditions are satisfied as compared to where the second reference value Accc is not changed to be larger even when the vehicle 60 is towing a towed vehicle. Further, since it is determined whether or not the vehicle speed V is equal to or lower than the reference value Vb, it is possible to determine whether or not an erroneous start may occur due to an erroneous accelerator operation of the driver more accurately compared to where a vehicle speed is not determined.

Further, according to the embodiment, when it is determined that the accelerator operation of the driver is an erroneous operation (S60), the driving force generated by the drive device 24 is limited to the upper limit value (S100, S130). In addition, when it is determined that the vehicle 60 is towing a towed vehicle (S10), the upper limit value is increased as compared to where it is determined that the vehicle is not towing a towed vehicle (S102 to S120).

Therefore, it is possible to reduce a possibility that the vehicle 60 will not start smoothly due to an insufficient driving force generated by the drive device 24 as compared to where the upper limit value is not changed to be larger even when it is determined that the vehicle 60 is towing a towed vehicle.

Further, according to the embodiment, the upper limit value is variably set according to the total weight W of the vehicle 60 so that the larger the total weight of the vehicle is, the larger the upper limit value is (S102 to S120). Therefore, compared to where the upper limit value is not variably set according to the total weight W of the vehicle 60 as described above, in a situation where the vehicle is towing a towed vehicle and climbing a slope, it is possible to reduce a possibility that the vehicle and the towed vehicle are hindered from starting or the vehicle and the towed vehicle slide down along the slope due to an insufficient driving force of the vehicle.

Further, according to the embodiment, when it is determined that there is an obstacle in front of the vehicle 60 and the accelerator operation of the driver is determined to be an erroneous operation (S82), the driving force generated by the drive device 24 is limited to the upper limit value (S100, S130). Therefore, while avoiding the driving force from being unnecessarily limited in the situation where there is no obstacle in front of the vehicle 60, the driving force can be limited and the erroneous start can be suppressed in a situation where the vehicle may collide with an obstacle if the vehicle starts erroneously.

Although the present disclosure has been described in detail with reference to the specific embodiment, it will be apparent to those skilled in the art that the present disclosure is not limited to the above-described embodiment, and various other embodiments are possible within the scope of the present disclosure.

For example, in the above-described embodiments, when the vehicle 60 is towing a towed vehicle (S10), the reference values for determination regarding the accelerator opening Acc and the accelerator opening speed Accd are set to values when towing that are larger than the standard values (S50). However, only one of the reference value for the determination regarding the accelerator opening Acc and the reference value for the determination regarding the accelerator opening speed Accd may be set to a value when towing that is larger than the corresponding standard value.

In the above-described embodiments, the vehicle 60 has a traction sensor 54, and in step S10, it is determined whether or not the vehicle 60 is towing a towed vehicle based on detection result of the traction sensor 54. However, whether or not the vehicle is towing a towed vehicle may be determined based on information behind the vehicle taken by a back camera. A weight of the vehicle is estimated based on the relationship between a braking force of the vehicle and a deceleration, and whether or not the vehicle is towing a towed vehicle may be determined by determining whether or not the estimated weight is larger than the weight of the vehicle alone. Further, these determinations may be combined.

In the above-described embodiments, a total weight W of the vehicle 60 is estimated, and in the setting control of the required acceleration Gxdr executed according to the flowchart shown in FIG. 5, the required acceleration is variably set so as to increase as the total weight W increases. However, the estimation of the total weight W of the vehicle 60 is omitted, and the required acceleration Gxdr may be set to a constant value regardless of the total weight W.

In the above-described embodiments, it is not determined whether or not the vehicle 60 is in a situation of climbing a slope. However, when the vehicle 60 is in a situation of climbing a slope, the setting control of the required acceleration executed according to the flowchart shown in FIG. 5 is executed, and when the vehicle 60 is not in a situation of climbing a slope, the required acceleration Gxdr may be set to a constant value smaller than that when climbing a slope.

Further, in the above-described embodiments, an inclination angle of a road on which the vehicle 60 climbs is not determined. However, the required acceleration Gxdr may be variably set so as to increase as an inclination angle of a road increases.

Further, in the above-described embodiments, the towed vehicle 102 includes the brake ECU 104, the brake actuator 108, and the friction braking mechanisms 112. However, the erroneous start suppression device of the present disclosure may be applied to a vehicle towing a towed vehicle that is not provided with a brake ECU 104 and the like.

What is claimed is:

1. An erroneous start suppression device for a vehicle is provided that is equipped with an electronic control unit that controls a drive device that generates a driving force of the vehicle, and the electronic control unit determines whether or not an accelerator operation of a driver is an erroneous operation based on whether or not a predetermined determination condition is satisfied and limits a driving force generated by the drive device when the electronic control unit determines that the accelerator operation of the driver is an erroneous operation, wherein
the electronic control unit determines whether or not the vehicle is towing a towed vehicle and changes the predetermined determination condition so that it becomes difficult to determine that the predetermined determination condition is satisfied when it is determined that the vehicle is towing a towed vehicle.

2. The erroneous start suppression device for a vehicle according to claim 1, wherein the predetermined determination condition includes that an accelerator opening is equal to or larger than a first reference opening and an accelerator opening speed is equal to or higher than a reference opening speed, and the electronic control unit is further configured to change at least one of the first reference opening and the reference opening speed to be larger when it is determined that the vehicle is towing a towed vehicle.

3. The erroneous start suppression device for a vehicle according to claim 1, wherein the predetermined determination condition includes that a vehicle speed of the vehicle is equal to or lower than a reference value and an accelerator opening is equal to or larger than a second reference opening, and the electronic control unit is further configured to change the second reference opening to be larger when it is determined that the vehicle is towing a towed vehicle.

4. The erroneous start suppression device for a vehicle according to claim 1, wherein the electronic control unit is configured to limit the driving force generated by the drive device to an upper limit value when it is determined that the accelerator operation of the driver is an erroneous operation, and the electronic control unit is further configured to increase the upper limit value as compared to where it is determined that the vehicle is not towing a towed vehicle when the electronic control unit determines that the vehicle is towing the towed vehicle when the electronic control unit determines that the vehicle is towing a towed vehicle.

5. The erroneous start suppression device for a vehicle according to claim 4, wherein the electronic control unit is configured to acquire information on a total weight of the vehicle and a towed vehicle, and variably, set the upper limit value according to the total weight so that the larger the total weight is, the larger the upper limit value is.

6. The erroneous start suppression device for a vehicle according to claim 4, wherein the electronic control unit is configured to limit the driving force generated by the drive device to the upper limit value when it is determined that there is an obstacle in front of the vehicle and the accelerator operation of the driver is an erroneous operation.

\* \* \* \* \*